United States Patent [19]
Green

[11] Patent Number: 5,188,340
[45] Date of Patent: Feb. 23, 1993

[54] WEED EXTRACTION DEVICE

[75] Inventor: William J. Green, Salt Lake City, Utah

[73] Assignee: Colleen A. Green, Salt Lake City, Utah

[21] Appl. No.: 787,519

[22] Filed: Nov. 4, 1991

[51] Int. Cl.$^5$ .............................................. B66F 3/00
[52] U.S. Cl. .................... 254/132; 254/131; 172/21; 172/378
[58] Field of Search ............... 254/132, 131, 131.5, 254/133 R; 172/21, 22, 19, 378; 171/21, 50, 57, 60, 65, 62, 83; 111/99, 106, 92

[56] References Cited

U.S. PATENT DOCUMENTS 2,349,621  5/1944  Hardman .............................. 254/132

Primary Examiner—Bruce M. Kisliuk
Assistant Examiner—Eileen P. Morgan
Attorney, Agent, or Firm—M. Ralph Shaffer

[57] ABSTRACT

A weed extraction device for digging, cutting, twisting and pulling out weeds. The weed extraction device includes a rod member from which a handle is formed by bending the rod member. The handle is useful in pushing the device into the ground and to twist the device to twist out the weeds and by which the user can pull the weed from the ground without bending over. The rod member also includes a foot step which is formed by bending the rod member and is useful in pushing the device into ground to the depth of the tap root. Attached permanently to the rod member is the root trap which is a half-cone or hemiconically shaped cutting, coring and compacting portion of the device. The root trap is useful to dig into the ground, cut a cone shaped plug, compact the tap root and branch roots and twist out the weed including the tap root which prevents the root from ever growing again. The cutting teeth of the root trap on the leading edge of the root trap cut the branch roots and free the branch roots from attachment to the soil. The twisting action of the handle, rod member and the root trap results in the twisting free of the weed. The device is used to pull the weed out of the ground from the standing, upright position with little effort or back-strain.

6 Claims, 4 Drawing Sheets

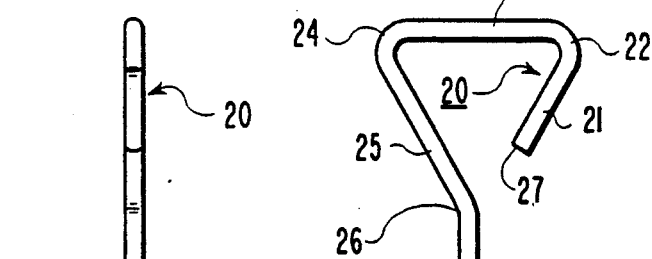

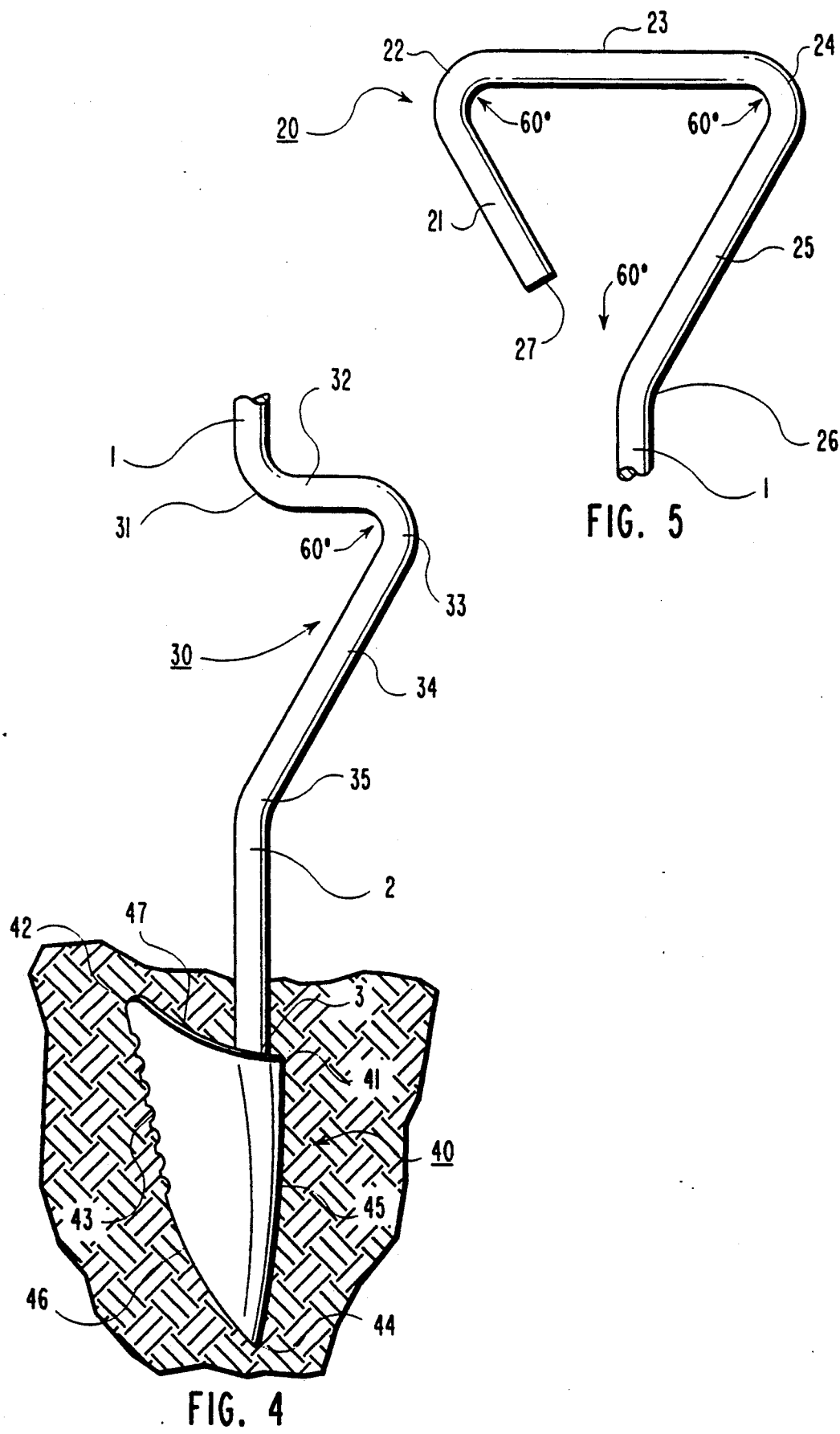

WEED EXTRACTION DEVICE

FIELD OF INVENTION AND BACKGROUND OF THE INVENTION TECHNICAL FIELD

This invention relates to the extraction of weeds, plants, shrubs and/or trees. The present invention relates to an improved weed extraction tool which cuts side roots, compacts the root ball and twists out the tap root all from a standing upright position with a minimum of physical force.

PRIOR ART

The tool used in the past to dig weeds, primarily dandelions, utilizes a forked prong shaped from a round metal rod attached to a wooden handle which requires the person digging the weeds to be on his knees and with great difficulty forcing the forked prong into the ground to cut off the root and then by hand pulling the weed out of the ground. The nature of this tool results in back strain and soreness to the palm of the hand from the force required at the handle to push the tool repeatedly into the ground.

A more recent invention, U.S. Pat. No. 4,243,206 (1981) to Heikkinen et al. claims a foot operated lever pivotally connected to the front end of the lever with a plurality of tines for insertion into the ground. When the operator of this device steps on the foot lever, the tines are pivoted upwards to dislodge weeds, lawn or other plant matter on top of the tines. The weeds are ejected or "popped off" by the means of a clean off plate which is activated by a spring. In theory this device offers reasonable functions but in practice this "weed popper", it is believed, simply may not work as effectively as the present invention. The tines of former device digs up everything in its way and sometimes hits the roots of the weed but the lawn and other nearby plant material are also dug up which is not desirable. This former device also leaves much of the root still embedded in the ground and the weed is left free to grow again. While this device pops off the plant material onto the ground, it still requires the operator to bend over to pick up the extracted plant material and it leaves an ugly hole in the lawn. In addition this former device with its plurality of moving parts along with the force on its operation lever is believed prone to malfunctions and breakage leading to dissatisfaction in the purchaser.

Other devices utilize an apparatus to grab the weed above the ground level and attempt to pull the weed from the ground. However these devices usually fail because the root of the weed is stronger than the stock and leaves and the weed breaks off leaving the root in the ground to regenerate.

Still other devices like a hoe or other surface cutters also leave the roots in the ground to grow again. Subsurface cutters should be preferred, however, a device as will be demonstrated in the present invention that utilizes a sub-surface twisting and pulling of the tap root in its entirety is the preferred action.

There exists a need for a weed extraction device which pulls the tap root from below the surface, which can be operated easily from the standing position without bending and which has no moving or attachable parts that could break or malfunction. The present invention capitalizes on such features as will be presently shown.

SUMMARY OF THE INVENTION

A weed extraction device designed to pull out weeds with the tap root in its entirety is disclosed. The tool is a rod of sufficient length to allow the user to operate from the standing position to pull out weeds without bending over. The handle of the tool is bent from the rod member to eliminate the attachment of a handle so as to allow the entire tool to be manufactured from the same rod member. The handle consists of three bends forming an equilateral triangle of sufficient size to accommodate the grip of the hand upon the handle portion to effect a twisting motion with easy. From the handle continuing down the straight, vertical portion of the rod member, three additional bends occur in the rod member. The first bend is perpendicular to the vertical rod member and forms a stepping platform to accommodate the foot of the user such as to provide a step to push the tool in a downward motion into the ground to the depth of the tap root. The second bend is obliquely directed down and back to the vertical orientation of the rod member. The third bend returns the rod member to the vertical orientation and the original direction of the rod member such as to be perpendicular to the surface of the ground. The step and the return bends are of such a sufficient distance from the bottom of the rod to allow the rod to penetrate the ground to the depth of the tap root of the weed.

In the present invention, at the bottom of the rod and permanently attached to the rod, the root trap is welded to the rod. The root trap is in the shape of essentially a half cone which consists of one half of the vertical height of the prescribed conical shape. The root trap in the preferred configuration of the present invention is welded to the rod in such a manner as to have the rod member inside the half-cone-shaped root trap at one end side of the medium length side of the half cone with the point of the cone pointing downwards towards the surface of the ground. The longer length, diagonal side of the half cone root trap has cutting teeth along its outside edge with the cutting teeth in a horizontal attitude to the vertical rod member such as to allow the teeth of the root trap to cut off the branch roots of the weed when the handle is twisted while the root trap is in the ground below the surface. When the rod is twisted by the user by means of the handle the root trap gathers the tap root, compacts the soil and the tap root into a cone shaped plug. The weed then twists out freely and by pulling the rod member upwards out comes the weed with the attached tap root. By raising the rod upwards to the user's free hand the weed in its cone shaped plug can be easily removed from the root trap without bending over to pick up the weed. Every weed is removed with the same operation. The point of the root trap is inserted in a downward motion next to the weed and is pushed down into the ground by means of the handle or by an assist from the foot pushing down on the step to a sufficient depth to attach the tap root. The handle is then twisted in a direction to direct the cutting teeth of the root trap to cut the branch roots and force the soil and tap root back towards the rod member which is attached to the opposite side of the root trap from the cutting teeth. The rod member and the half-cone shaped root trap compacts the soil and tap root into the conned shaped plug with the larger end of the cone upwards and the point of the cone containing the tap root downwards. When the user twists the handle and sees the above surface leaves and stock of the weed also twisting then the weed and the tap root are free from its attachment to the soil and the weed is pull upwards and out of the ground. Each operation is the same; push downwardly, twist and pull upwardly and out comes the weed effortlessly.

BRIEF DESCRIPTION OF THE DRAWINGS

FIGS. 1, 2 and 3 are elevations showing the tool in its vertical position with each view a respective and progressive 90 degree rotation, counter-clockwise looking down, of the tool around the vertical axis; FIGS. 1, 2 and 3 show the entire tool, i.e. handle, rod member, foot step and root trap.

FIG. 4 is an enlarged detail taken along the arcuate line 4—4 in FIG. 1, showing a detail of the foot step and the half-cone shaped root trap and also where the root trap joins the rod member.

FIG. 5 shows the detail of the handle and is taken along the arcuate line 5—5 in FIG. 1.

DETAILED DESCRIPTION OF THE DRAWINGS

Figure 6:
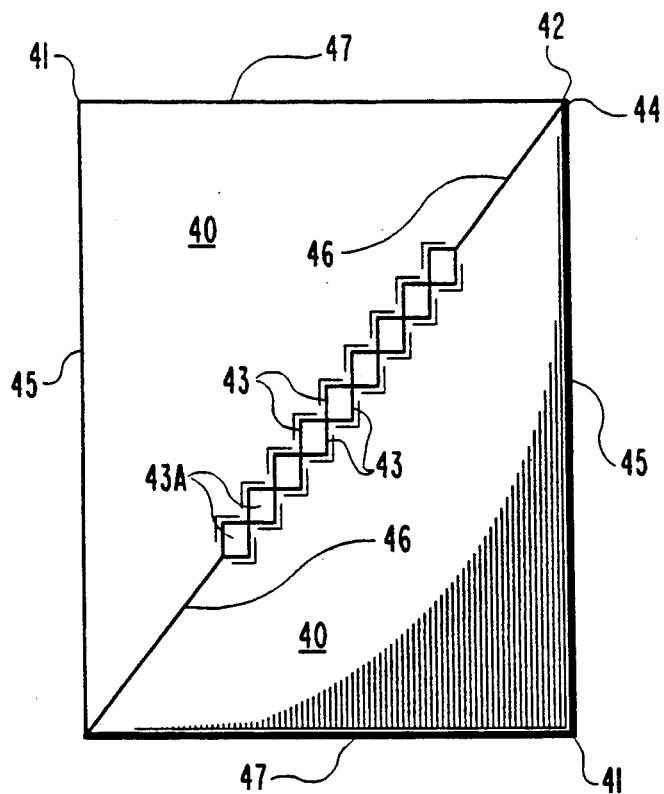
FIG. 6 shows in flat-pattern layout the rectangular shape of the metal from which two root traps are cut with the cutting teeth on the diagonal of the rectangle, the punched incremental rectangles being punched out to leave blank spaces between the side-opposite teeth.

As shown in FIG. 1, the weed extraction device is referred to generally as 10 and may include the handle 20 formed by bending the rod member 1 at point 26 at a 60 degree angle to the vertical axis defining the side 25 with a second 60 degree angle bend at point 24 to defining the handle portion 23 which is then perpendicular to the vertical axis of the rod member 1. A third bend at point 22 further defines the equilateral triangular shape of the handle 20 to side 21 at the end of the rod member and the termination of the handle portion 27 of the handle 20 of device 10. Further in FIG. 1, the upper which is shown to be in upright working position. The upper portion of the rod member 1 thus continues to point 31 where the foot step device. The upper portion of the device 1 continues to point 31 where the foot step, generally referred to as 30, is provided in the invention. At point 31 a 90 degree bend is made in the rod member to provide a foot step portion 32 to assist the user in forcing the device into the ground to the depth of the tap root of the weed. At point 33 another 60 degree bend downward and towards the vertical axis of the rod member is made, thus creating side 34 which again joins the downward vertical axis of the rod member at point 35; another 60 degree bend returns the rod member to its original vertical orientation to the entire device 10. The lower portion of the rod member below the foot step 30 is generally referred to as 2 and continues downward the rod member until it ends at the juncture point 3 where the root trap, generally referred to as 40, is attached to the rod member. The rod member portion 4, see FIGS. 3 and 7, and which is attached to the root trap 40, defines that portion of the rod member which is below point 3 and is part of the hemi-conical or cone sector root trap 40. The root trap 40 is attached to the rod member at 41 at portion 4 and continues downward on the middle length side 45 of the root trap 40. From 41 the top portion of the half-cone shaped trap or trap member 40 continues on the short side 47 or top edge of the half circle section of the half-cone to point 42. The longer length, diagonal side 46 contains the cutting teeth 43 of the root trap 40. Continuing downward to the point of the cone end, the tip 44 of the root trap 40 is the point 44 where the root trap 40 enters the ground.

FIG. 2, is a 90 degree, counter-clockwise rotation, looking down, of the device 10 and shows the handle 20, the upper rod member 1, the foot step 30, the lower rod member 2 and a side view of the root trap 40. FIG. 3, is a 90 degree, counter-clockwise rotation with respect to FIG. 2, and an 180 degree, counter-clockwise rotation from FIG. 1. FIG. 3, shows the same parts as FIG. 1, but from the reverse side, with the main advantage of this view point showing the interior of the root trap 40 and its attachment to the rod portion member 2 at point 3 and continuing downward on 4 that portion of the rod member 2 which attaches the root trap 40 to the rod member 2. The inside of the root trap 40 is the tapered half cone of the root trap which defines the confined space and thus which gathers and compacts the weed, tap root and soil into a cone shaped plug.

FIG. 4 shows a sectional view of the lower portion of the weed extraction device 10 starting at the upper portion of the device 1 to point 31, where a bend is formed in the rod member portion 2 to be perpendicular at a right angle to the rod member portion 2. The bend forms the foot step portion 32 which provides a step for which to push the device into the ground with ease. At point 33 another 60 degree bend is formed to turn downward back to the vertical axis of the rod member forming side 34 which continues to point 35, where another 60 degree bend returns the foot step 30 back to the original direction of the rod member portion 2 on the lower portion of the device 10. The lower portion 2 of the rod member reaches a junction, at rod portion 3, with the root trap 40 at point 41. The top portion and shortest side 47 of the root trap 40 ends at point 42 at side 46 which is the longest length, diagonal side of the root trap 40 and which contains the teeth 43 of the root trap or root trap member 40. Side 46 ends at point 44 which is the tip of the half-cone shaped root trap 40 and point 44 is the first portion of the root trap to cut the soil as the device 10 enters the ground.

FIG. 5, shows the handle portion, generally referred to as 20, of the weed extraction device 10. The handle 20 is formed from the upper portion of the rod member 1 by a 60 degree bend at point 26 defining the handle side 25. From side 25 at point 24 the rod member is again bent at a 60 degree angle to make the upper handle side 23 to be horizontal to the vertical rod member 1 such as to provide the handy handle for the user to push the device 10 into the ground from the standing position and to allow the user to twist the handle or handle 20 and twist out the weed. From side 23 at point 22 a third bend of 60 degrees is made to complete the equilateral triangular shape of the handle 20 and define the final portion of the rod member 1 with side 21 thus forming from a one piece rod member 1 the handle portion 20 of the device in the instant invention.

As shown to advantage in FIG. 6 is how two root traps 40 are formed from one rectangular shape by die cutting or other means the cutting teeth 43, contiguous with apertures 43A, are cut on the diagonal 46 of the root trap 40 such as to form two identical triangle portions to be shaped into the half-cone of the root trap 40. The longest length, diagonal side 46 is the cutting edge of the root trap 40. The shortest side 47 is the top portion or top edge 47 of the root trap, and the middle length side 45 is the trailing edge of the root trap 40 and is that side to which the rod member portion 2 is attached. In the instant invention and in the preferred configuration the flat triangle shaped root trap 40 is stamped and formed to conform to the preferred half-cone shape of the formed root trap 40.

Figure 7:
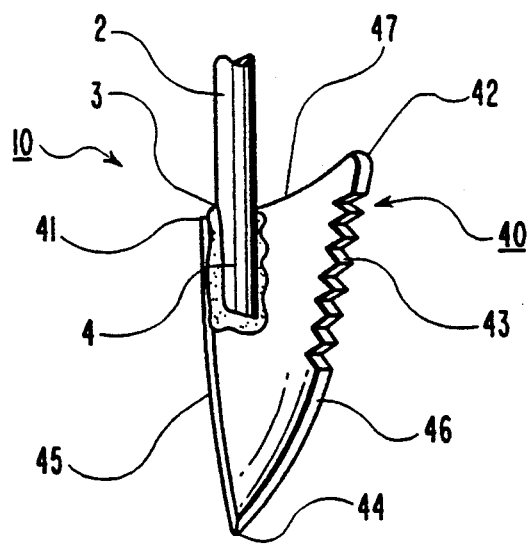
FIG. 7 is a side elevation showing the root trap in its half-cone shape and the attachment, as by welding, of the root trap to the rod member.

As shown in FIG. 7 the detail of the root trap 40 is revealed. The rod member portion 2 at point 3 meets the root trap 40 and is attached to that portion 4 of the rod member to form the cutting and extraction portion of the device 10. From point 41 to point 42 is formed the shortest side or top edge 47 which is the open side of the cone shaped root trap 40. From point 42 to point 44 defines the longest length, diagonal side 46 which contains the cutting teeth 43. From point 44, which is the entry point of the device 10 into the ground, back to point 41 defines side 45 which is the side which is attached to the rod member portion 2 on that portion 4 to point 3 of the rod member portion 2 and completes the root trap 40 configuration. In a preferred configuration of the present invention the rod member termination portion 4 is on the inside of the root trap 40 so as to be on the inside of the half-cone shaped root trap 40. It should be noted that in this configuration shown the device 10 is rotated in a clockwise direction, looking down to activate the cutting teeth 43 and the compacting and twisting action of the root trap 40; however the mirror image of this device operating in a counter-clockwise direction, which would be preferred by left-handed operators, would work equally as well and these drawings are not meant to limit or constrict other configurations and/or sizes of the instant invention.

Figure 8:
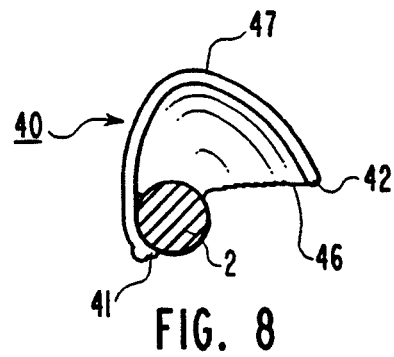
FIG. 8 shows the top view of the root trap and a sectional view of the rod member, and is taken along the line 8—8 in FIG. 7.

FIG. 8 shows a view of the root trap 40 from the view point of the user looking downward the rod member 2 to the bottom of the device 10. Side 47 is the shortest length side of the root trap 40 and is defined by points 41 and 42 and shows the half-cone shape of the root trap 40.

Figure 9:
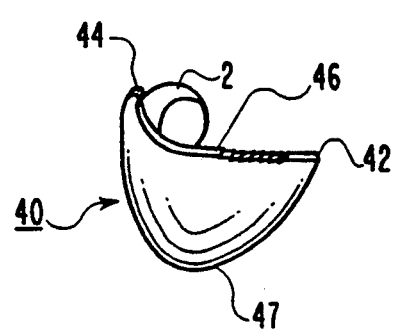
FIG. 9 is a bottom view of the structure of FIG. 8.

FIG. 9 is a bottom view of FIG. 8. and shows the same half-cone shape of side 47 as defined by points 41 and 42 and the attachment of the root trap 40 to the rod member portion 2.

Figure 10:
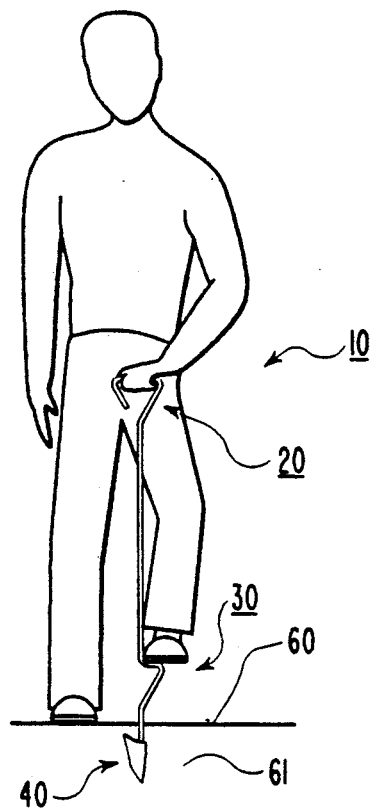
FIG. 10 depicts a full figure view of a person operating the weed extraction device with operator's hand on the handy handle and the foot on the foot step, demonstrating the operation of the device from the standing upright position of the preferred configuration of the present invention.

FIG. 10 is a pictorial representation of a person using the weed extraction device 10. The device is pushed preferably below the ground 61 by means of the handy handle 20 and with assistance of the user's foot on foot step 30. The root trap 40 is below the ground line 60 ready to engage a weed.

Figure 11:
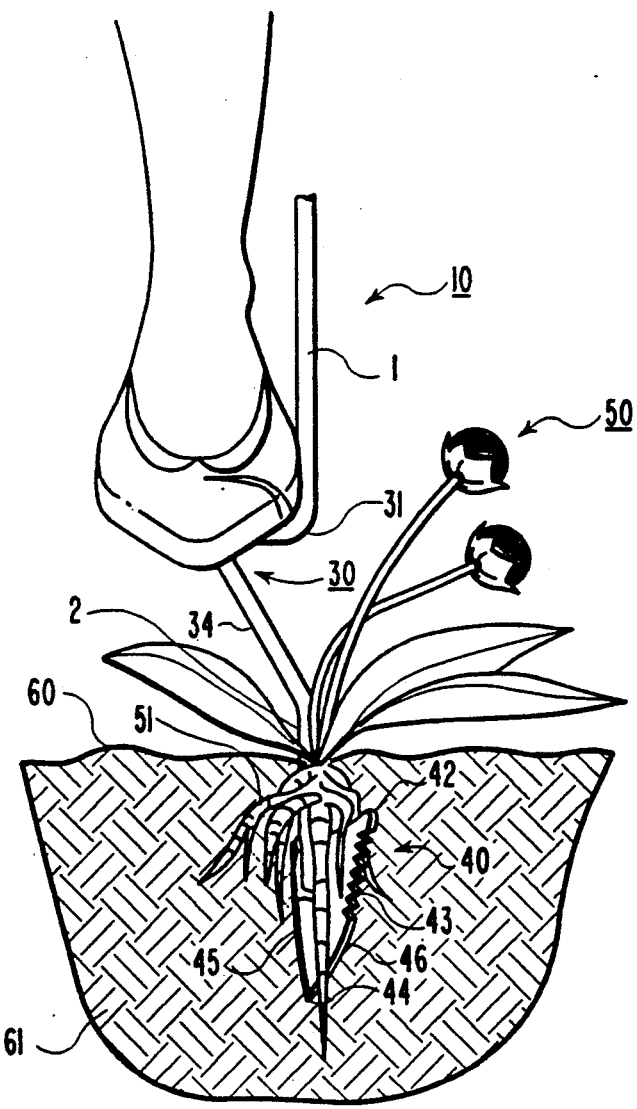
FIG. 11 is an enlarged detail of the lower portion of the tool in FIG. 3 and shows a close-up of the foot step, the lower section of the rod member, the root trap below ground level trapping the tap root of a weed illustrating the below ground function of the weed extraction device.

FIG. 11 is a detailed pictorial representation of the weed extraction device 10 with the operator's foot on the foot step 30 pushing the root trap 40 below the ground 61 and engaging the weed 50. The upper rod portion of member 1 is show above the foot step 30 and proceeds downward to the foot step perpendicular member 32 where on rests the operator's foot. Side 34 of the foot step 30 returns the downward force of the user's foot to the lower rod member portion 2. The root trap 40 is shown below the ground 61 where root trap tip 44 is to the depth of and behind the tap root 55 of the weed 50. The root trap cutting teeth 43 cut the branch roots 51 of the weed 50 when the device 10 is rotated. Side 46 of the root trap 40 is the gathering edge of the device 10 and forces the branch roots 51 the tap root 55 and the ground 61. within the cone shaped hole to be formed by the twisting of the device 10 below the ground 61. The root trap 40 cuts, gathers and compacts the branch roots 51 and the tap root 55 into a cone shaped plug. When the user observes that the twisting action of the device 10 causes a twisting action of the weed leaves and stems 52 above the ground 62 then the weed 50 is free from the earth and may easily be pulled from below the ground 61 by the user in an upright standing position. The tap root 55 is removed from the earth never to grow again.

It is to be understood that the embodiments of the invention herein described are merely illustrative of the application of the principles of the invention. Reference herein to details of the illustrated embodiment is not intended to limit the scope of the claims which themselves recite those features regarded as essential to the invention. Likewise, the scale or size of the illustrations is not meant to limit the scope or design of the invention. In a larger scale, the invention could extract shrubs or trees. In a smaller scale, the invention could weed planter boxes. Also in a reverse operation, the device could be used to dig a cone shaped hole, then extract plants, shrubs or trees and in turn replant the extracted plants, shrubs or trees into the conned shaped hole dug by the device. Also the mention of preferred manufacturing materials, methods and application of the present invention are not meant to limit its scope or design of the invention. The listing of angle of bends in the preferred configuration of the present invention are also not meant to limit the scope or design of the invention.

What is claimed:

1. A weed extraction device for digging, cutting, twisting and pulling weeds from the ground, comprising:
    (a) a rod member having upper and lower portions and a laterally extending foot step joining said upper and lower portions,
    (b) a handle provided said upper portion, and
    (c) a vertically oriented, downwardly tapered, root trap formed essentially as a conical sector and secured to said lower portion and extending downwardly therefrom, said root trap having a serrated side forming weed-cutting teeth.

2. A weed extraction device for digging, cutting, twisting and pulling weeds from the ground, comprising:
    (a) a vertically oriented rod member having a handle, an upper portion joined to said handle, a lower portion joined to said upper portion, and a laterally extending foot step portion integral with and proximate the juncture of said upper and lower portions, and
    (b) a vertically oriented, downwardly tapered, essentially hem-conically shaped root trap secured to said lower portion and extending downwardly therefrom, said root trap having a serrated side forming weed-cutting teeth.

3. The structure of claim 2 wherein said root trap is essentially formed as a segment of a cone having an upper arcuate edge, a side edge secured to said lower portion, and a diagonal-type serrated side edge constructed to cut through the soil and weeds upon the twisting of said rod member through turning movements of said handle.

4. The structure of claim 2 wherein said root trap comprises a triangularly shaped rectangle-half, prior to cone-sector shaped forming, and provided a tooth-forming, serrated diagonal side.

5. The structure of claim 2 wherein said foot step portion comprises a portion of said rod member which is bent at three angle areas for step configuration from the general vertical character of said rod member.

6. The structure of claim 2 wherein said root trap constitutes one of a pair of triangles formed as a conical sector and developed from rectangular sheet stock having a stamped and toothed diagonal, the remaining triangle when formed being available as a second root trap.

* * * * *